United States Patent
Zhou

(10) Patent No.: US 12,181,764 B2
(45) Date of Patent: Dec. 31, 2024

(54) LIQUID CRYSTAL PANEL AND RELATED MANUFACTURING METHOD

(71) Applicant: Guangzhou China Star Optoelectronics Semiconductor Display Technology Co., LTD., Guangdong (CN)

(72) Inventor: Shixin Zhou, Guangdong (CN)

(73) Assignee: Guangzhou China Star Optoelectronics Semiconductor Display Technology Co., LTD., Guangzhou (CN)

( * ) Notice: Subject to any disclaimer, the term of this patent is extended or adjusted under 35 U.S.C. 154(b) by 0 days.

(21) Appl. No.: 18/509,461

(22) Filed: Nov. 15, 2023

(65) Prior Publication Data

US 2024/0361658 A1    Oct. 31, 2024

(30) Foreign Application Priority Data

Apr. 25, 2023  (CN) .......................... 202310461008.7

(51) Int. Cl.
*G02F 1/1335* (2006.01)
*G02F 1/1343* (2006.01)
*G02F 1/1362* (2006.01)
*G02F 1/1368* (2006.01)

(52) U.S. Cl.
CPC ...... *G02F 1/1368* (2013.01); *G02F 1/133553* (2013.01); *G02F 1/134318* (2021.01); *G02F 1/134363* (2013.01); *G02F 1/136286* (2013.01)

(58) Field of Classification Search
CPC ............. G02F 1/1335; G02F 1/133512; G02F 1/133553; G02F 1/1343; G02F 1/134309; G02F 1/134318; G02F 1/134363; G02F 1/1362; G02F 1/136209; G02F 1/136227; G02F 1/136286; G02F 1/1368
See application file for complete search history.

(56) References Cited

U.S. PATENT DOCUMENTS

2007/0109455 A1*  5/2007  Kim .................. G02F 1/134309
349/43

* cited by examiner

*Primary Examiner* — Thoi V Duong

(57) ABSTRACT

A liquid crystal panel including an array substrate, in which a common electrode layer is disposed on a substrate and includes a common electrode and a reflective portion, the common electrode is disposed corresponding to a pixel region, the reflective portion is disposed corresponding to a non-pixel region, a signal component is disposed corresponding to the non-pixel region, at least a part of the signal component is disposed on the reflective portion, an insulating unit layer is disposed on the signal component and covers the common electrode layer and the substrate, a pixel electrode is disposed corresponding to the pixel region on the insulating unit layer, and the pixel electrode and the common electrode are configured to generate an electric field.

20 Claims, 3 Drawing Sheets

LIQUID CRYSTAL PANEL AND RELATED MANUFACTURING METHOD

CROSS REFERENCE TO RELATED APPLICATION

This application claims the benefit of priority of Chinese Patent Application No. 202310461008.7 filed on Apr. 25, 2023, the contents of which are incorporated by reference as if fully set forth herein in their entirety.

FIELD OF DISCLOSURE

The present disclosure relates to a field of display technology, specifically relates to a liquid crystal panel.

BACKGROUND

Dark-state light leakage of fringe field switching (FFS) mode liquid crystal panels is more severe than that of vertical alignment (VA) mode liquid crystal panels. In an FFS mode liquid crystal panel, a polarized light emitted from a lower polarizer is affected by birefringence of liquid crystals after passing through the liquid crystals. Since a light incident on an upper polarizer is elliptically polarized light, there is a component in an axis direction of the upper polarizer, which causes light leakage and reduces contrast.

SUMMARY

An embodiment of the present disclosure provides a liquid crystal panel that can reduce a risk of light leakage, thereby improving contrast in a dark state.

An embodiment of the present disclosure provides a liquid crystal panel comprising an array substrate. The array substrate comprises a pixel region and a non-pixel region disposed around the pixel region. In the array substrate, a common electrode layer is disposed on a substrate and includes a common electrode and a reflective portion, the common electrode is disposed corresponding to the pixel region, the reflective portion is disposed corresponding to the non-pixel region, a signal component is disposed corresponding to the non-pixel region, at least a part of the signal component is disposed on the reflective portion, an insulating unit layer is disposed on the signal component and covers the common electrode layer and the substrate, a pixel electrode is disposed corresponding to the pixel region on the insulating unit layer.

Optionally, the reflective portion comprises a first transparent conductive layer and a reflective layer. The first transparent conductive layer and the reflective layer are stacked on the substrate.

Optionally, the reflective portion further comprises a second transparent conductive layer disposed on the substrate. The reflective layer is disposed on the first transparent conductive layer, and the second transparent conductive layer is disposed on the reflective layer.

Optionally, the common electrode is connected to the first transparent conductive layer and the second transparent conductive layer. A thickness of the common electrode is equal to a sum of a thickness of the first transparent conductive layer and a thickness of the second transparent conductive layer.

Optionally, the common electrode comprises a third transparent conductive layer and a fourth transparent conductive layer that are stacked. The third transparent conductive layer is disposed on the substrate. The signal component comprises a common electrode line connected to the common electrode. The first transparent conductive layer and the third transparent conductive layer are connected and integrally formed. The second transparent conductive layer and the fourth transparent conductive layer are connected and integrally formed.

Optionally, the first transparent conductive layer, the reflective layer, and the second transparent conductive layer are stacked to form a Bragg reflective structure.

Optionally, the liquid crystal panel further comprises an active layer, a source electrode, and a drain electrode. The signal component comprises a gate electrode, the insulating unit layer comprising a first insulating layer and a second insulating layer. The gate electrode is disposed on the reflective portion. The first insulating layer covers the gate electrode, the common electrode, and the substrate. The active layer is disposed on the first insulating layer, the source electrode and the drain electrode are spaced apart on the active layer.

The second insulating layer covers the source electrode, the drain electrode, the active layer, and the first insulating layer. The pixel electrode is disposed on the second insulating layer and connected to the source electrode or the drain electrode.

Optionally, the liquid crystal panel further comprises a first trace and a transfer line. The first trace is disposed in a same layer as the source electrode, and the transfer line is disposed in a same layer as the pixel electrode. The signal component comprises a second trace disposed on the reflective portion and disposed in a same layer as the gate electrode. An end of the transfer line is connected to the first trace, and the other end of the transfer line is connected to the second trace.

Optionally, the signal component further comprises a data line disposed in a same layer as the source electrode and disposed corresponding to the reflective portion.

Optionally, the liquid crystal panel further comprises a counter substrate disposed opposite to the array substrate. The counter substrate comprises a black matrix, and the black matrix is disposed corresponding to the reflective portion.

Another embodiment of the present disclosure provides a method for manufacturing an array. The method includes: forming a common electrode layer on a substrate, wherein the common electrode layer comprises a common electrode corresponding to a pixel region and a reflective portion corresponding to a non-pixel region; forming a signal component on the reflective portion corresponding to the non-pixel region; forming an insulating unit layer on the substrate; and forming a pixel electrode on the insulating unit layer.

Optionally, the forming the common electrode layer on the substrate comprises: sequentially forming a first transparent conductive material layer and a reflective material layer on the substrate; and patterning the first transparent conductive material layer and the reflective material layer to form a first transparent conductive layer, a reflective layer, and a third transparent conductive layer with a mask.

Optionally, the first transparent conductive material layer is made of an oxide semiconductor material, and the reflective material layer is made of metallic material with reflective properties.

Optionally, a thickness of the first transparent conductive material layer ranges between 50 angstroms and 100 angstroms.

Optionally, the mask is a grayscale mask or a halftone mask.

Optionally, the forming the signal component on the reflective portion corresponding to the non-pixel region, comprises: sequentially forming a second transparent conductive material layer and a first metal layer on the substrate; patterning the second transparent conductive material layer and the first metal layer to form a second transparent conductive layer, a fourth transparent conductive layer, and a gate electrode and a second trace of the signal component, wherein the first transparent conductive layer, the reflective layer, and the second transparent conductive layer are stacked to form the reflective portion, and the third transparent conductive layer and the fourth transparent conductive layer are stacked to form the common electrode.

Optionally, the forming the insulating unit layer on the substrate, comprises: forming a first insulating layer covering the first metal layer and the common electrode layer; forming an active layer on the first insulating layer; forming a source electrode, a drain electrode, a first trace, and a data line on the first insulating layer; and forming a second insulating layer covering the source electrode, the drain electrode, the active layer.

Optionally, the second transparent conductive material layer is made of an oxide semiconductor material.

Optionally, a thickness of the second transparent conductive material layer ranges between 50 angstroms and 100 angstroms.

Optionally, the forming the pixel electrode on the insulating unit layer comprises: forming the pixel electrode and a transfer line on the insulating unit layer, wherein the transfer line is connected to the first trace and the second trace.

In the prior art, because signal components such as scan lines and data lines located in a non-pixel region have relatively large thicknesses, protrusions are formed on a side of an array substrate facing liquid crystals. When a liquid crystal panel is in a dark state, liquid crystals in areas where the protrusions are located have deflection differences, causing light leakage in the areas. In an embodiment of the present disclosure, a reflective portion is disposed in an area corresponding to a signal component in a non-pixel region to reflect an incident light. In this way, even if liquid crystals in the non-pixel region have a deflection difference, an amount of light leakage can be reduced, and a stray light caused by an insulating unit layer corresponding to the non-pixel region can be reduced, thereby improving contrast in a dark state. Furthermore, the reflective portion reflects the incident light, thereby reducing a risk of the incident light being absorbed by the signal component, and thus improving light utilization efficiency.

BRIEF DESCRIPTION OF DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION

Figure 1:
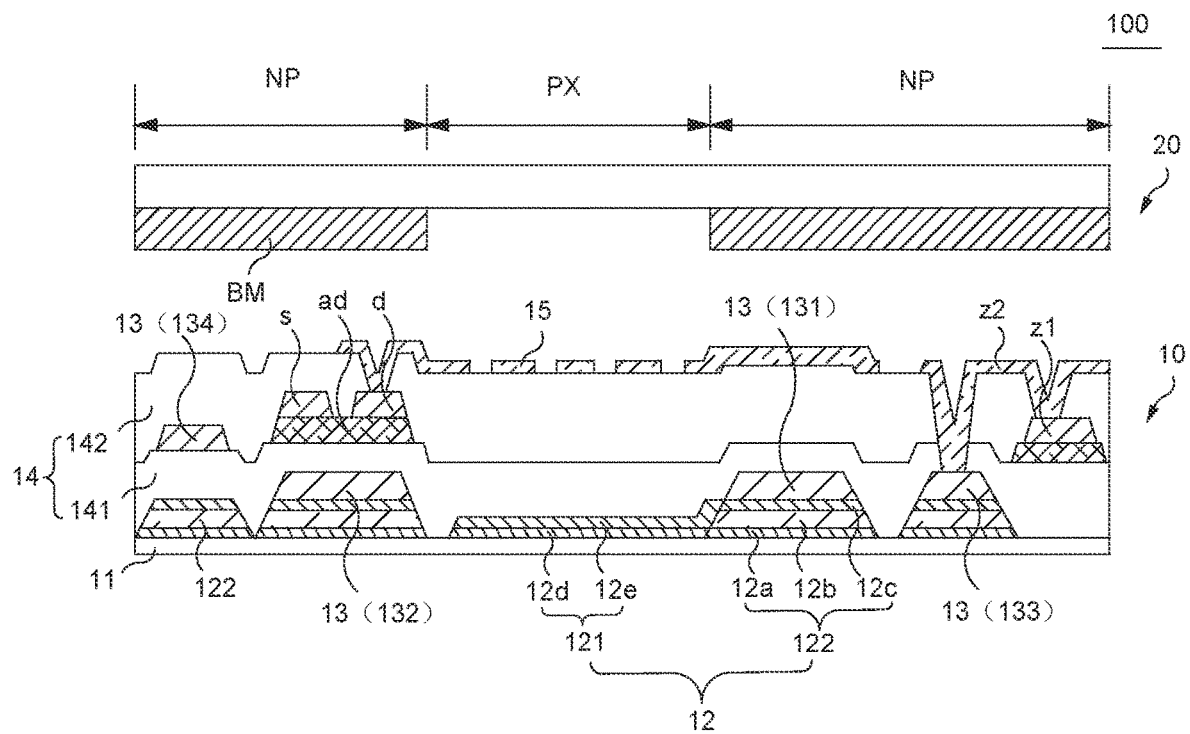
FIG. 1 is a schematic diagram of a structure of a liquid crystal panel according to an embodiment of the present disclosure.

The technical solutions in the embodiments of the present application will be clearly and completely described below with reference to the accompanying drawings in the embodiments of the present application. Obviously, the described embodiments are only some of the embodiments of the present application, rather than all of the embodiments. Based on the embodiments in this application, all other embodiments obtained by those skilled in the art without making creative efforts fall within the scope of protection of this application. In addition, it should be understood that the specific embodiments described here are only used to illustrate and explain the application, and are not used to limit the application. In this application, unless otherwise specified, the directional words used such as "upper" and "lower" usually refer to the upper and lower positions of the device in actual use or working conditions, specifically the direction of the drawing in the drawings. The terms "inside" and "outside" refer to the outline of the device.

An embodiment of the present disclosure provides a liquid crystal panel comprising an array substrate. The array substrate comprises a pixel region and a non-pixel region disposed around the pixel region. In the array substrate, a common electrode layer is disposed on a substrate and includes a common electrode and a reflective portion, the common electrode is disposed corresponding to the pixel region, the reflective portion is disposed corresponding to the non-pixel region, a signal component is disposed corresponding to the non-pixel region, at least a part of the signal component is disposed on the reflective portion, an insulating unit layer is disposed on the signal component and covers the common electrode layer and the substrate, a pixel electrode is disposed corresponding to the pixel region on the insulating unit layer, and the pixel electrode and the common electrode are configured to generate an electric field.

In the prior art, because signal components such as scan lines and data lines located in a non-pixel region have relatively large thicknesses, protrusions are formed on a side of an array substrate facing liquid crystals. When a liquid crystal panel is in a dark state, liquid crystals in areas where the protrusions are located have deflection differences, causing light leakage in the areas. In an embodiment of the present disclosure, a reflective portion is disposed in an area corresponding to a signal component in a non-pixel region to reflect an incident light. In this way, even if liquid crystals in the non-pixel region have a deflection difference, an amount of light leakage can be reduced, and a stray light caused by an insulating unit layer corresponding to the non-pixel region can be reduced, thereby improving contrast in a dark state. Furthermore, the reflective portion reflects the incident light, thereby reducing a risk of the incident light being absorbed by the signal component, and thus improving light utilization efficiency.

Figure 2:
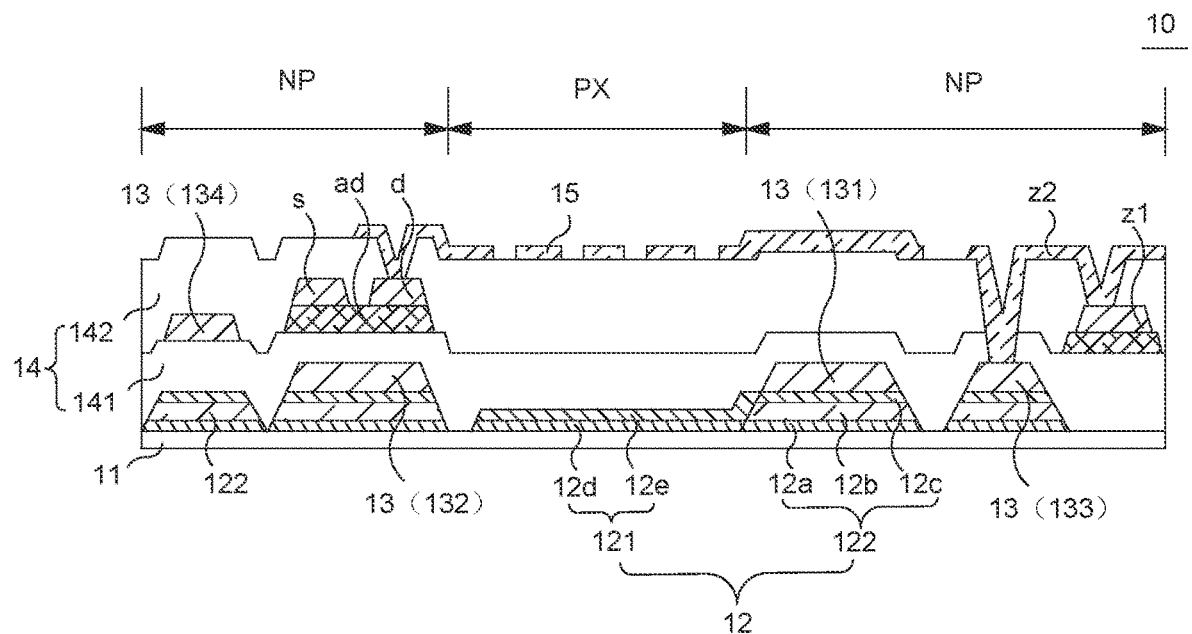
FIG. 2 is a schematic diagram of a structure of an array substrate of the liquid crystal panel according to an embodiment of the present disclosure.

Please refer to FIG. 1 and FIG. 2, an embodiment of the present disclosure provides a liquid crystal panel 100 comprising an array substrate 10 and a counter substrate 20. The array substrate 10 and the counter substrate 20 are arranged opposite to each other.

The array substrate 10 comprises a pixel region PX and a non-pixel region NP disposed around the pixel region PX. The array substrate 10 comprises a substrate 11, a common electrode layer 12, a signal component 13, an insulating unit layer 14, and a pixel electrode 15.

The common electrode layer 12 is disposed on the substrate 11. The common electrode layer 12 comprises a common electrode 121 and a reflective portion 122. The common electrode 121 is disposed corresponding to the pixel region PX. The reflective portion 122 is disposed corresponding to the non-pixel region NP. The signal component 13 is disposed corresponding to the non-pixel region NP. At least a part of the signal component 13 is disposed on the reflective portion 122. The insulating unit layer 14 is disposed on the signal component 13, and covers the common electrode layer 12 and the substrate 11. The pixel electrode 15 is disposed on the insulating unit layer 14. The pixel electrode 15 is disposed corresponding to the pixel region PX. The pixel electrode 15 and the common electrode 121 form an electric field under an action of an electrical signal.

In the liquid crystal panel 100, the reflective portion 122 is disposed in an area corresponding to the signal component 13 in the non-pixel region NP to reflect an incident light. In this way, even if the liquid crystals in the non-pixel region NP have a deflection difference, an amount of light leakage can be reduced, and a stray light caused by the insulating unit layer corresponding to the non-pixel region NP can be reduced, thereby improving contrast in a dark state. Furthermore, the reflective portion 122 reflects the incident light, thereby reducing a risk of the incident light being absorbed by the signal component 13, and thus improving light utilization efficiency.

Optionally, the reflective portion 122 comprises a first transparent conductive layer 12a and a reflective layer 12b. The first transparent conductive layer 12a and the reflective layer 12b are stacked on the substrate 11.

The first transparent conductive layer 12a may be used to protect the reflective layer 12b. The first transparent conductive layer 12a may be located on a side of the reflective layer 12b close to or away from the substrate 11.

The reflective portion 122 comprises a second transparent conductive layer 12c. The first transparent conductive layer 12a is disposed on the substrate 11. The reflective layer 12b is disposed on the first transparent conductive layer 12a. The second transparent conductive layer 12c is disposed on the reflective layer 12b.

Optionally, a thickness of the reflective layer 12b is greater than a thickness of the first transparent conductive layer 12a and a thickness of the second transparent conductive layer 12c.

It is noted that the thicker the reflective layer 12b, the better its reflective effect is. However, the thicker the reflective portion 122, the higher the protrusion of the array substrate 10 is, which increases a risk of light leakage. Therefore, in a case of thickening the reflective layer 12b, the thickness of the first transparent conductive layer 12a and the thickness of the second transparent conductive layer 12c are reduced to maintain or reduce a thickness of the reflective portion 122 and increase a reflectivity of the reflective portion 122, thereby increasing the contrast in the dark state.

Optionally, the first transparent conductive layer 12a, the reflective layer 12b, and the second transparent conductive layer 12c are stacked to form a Bragg reflective structure. That is, the reflective portion 122 has the Bragg reflective structure, which increases the reflectivity of the reflective portion 122, thereby improving the light utilization efficiency.

Optionally, a material of the first transparent conductive layer 12a and a material of the second transparent conductive layer 12c may be an oxide semiconductor material such as indium tin oxide or indium zinc oxide. A material of the reflective layer 12b may be a metallic material with reflective properties such as silver or aluminum.

In some embodiments, the reflective portion 122 may also have a Bragg structure formed by alternately stacking high refractive index layers and low refractive index layers. The high refractive index layers and the low refractive index layers are made of transparent conductive materials. Alternatively, the reflective portion 122 may be made of other high reflective layers.

Optionally, the common electrode 121 is connected to the first transparent conductive layer 12a and the second transparent conductive layer 12c. A thickness of the common electrode 121 is equal to a sum of the thickness of the first transparent conductive layer 12a and the thickness of the second transparent conductive layer 12c.

It is noted that the common electrode 121 may be formed in a same process as the first transparent conductive layer 12a and the second transparent conductive layer 12c to save process steps.

Optionally, the common electrode 121 comprises a third transparent conductive layer 12d and a fourth transparent conductive layer 12e that are stacked. The third transparent conductive layer 12d is disposed on the substrate 11.

The signal component 13 comprises a common electrode line 131. The common electrode line 131 is connected to the common electrode 121. The first transparent conductive layer 12a and the third transparent conductive layer 12d are connected and integrally formed.

The second transparent conductive layer 12c and the fourth transparent conductive layer 12e are connected and integrally formed.

The first transparent conductive layer 12a and the third transparent conductive layer 12d are connected and integrally formed, and they may be formed by patterning a same layer with a same mask. Similarly, the second transparent conductive layer 12c and the fourth transparent conductive layer 12e may be formed by patterning a same layer with a same mask.

That is, in this embodiment, the reflective portion 122 and the common electrode 121 are formed by a same photomask process to save photomask processes.

The fourth transparent conductive layer 12e is further connected to a side of the reflective layer 12b, thereby increasing a connection area between the common electrode line 131 and the common electrode 121, and thus reducing impedance. And, because the thickness of the reflective layer 12b is relatively large, the impedance is further reduced.

Optionally, the thicknesses of the first transparent conductive layer 12a, the second transparent conductive layer 12c, the third transparent conductive layer 12d, and the fourth transparent conductive layer 12e are between 50 angstroms and 100 angstroms, such as 50 angstroms, 60 angstroms, 70 angstroms, 80 angstroms, 90 angstroms, or 100 angstroms.

The thickness of the reflective layer 12b is between 200 angstroms and 1000 angstroms, such as 200 angstroms, 300 angstroms, 500 angstroms, 800 angstroms, or 1000 angstroms.

Optionally, the reflectivity of the reflective portion 122 may be 96% or more.

Optionally, in an orthographic projection of the array substrate 10, an orthographic projection of the signal component 13 is located within an orthographic projection of the reflective portion 122. That is, the reflective portion 122 completely covers the corresponding signal component 13, thereby increasing an area of the non-pixel region NP covered by the reflective portion 122, and thus reducing a risk of light leakage in the non-pixel region NP.

Optionally, the array substrate 10 further comprises an active layer ad, a source electrode s, and a drain electrode d. The signal component 13 comprises a gate electrode 132. The insulating unit layer 14 comprises a first insulating layer 141 and a second insulating layer 142.

The gate electrode 132 is disposed on the reflective portion 122. The first insulating layer 141 covers the gate electrode 132, the common electrode 121 and the substrate 11. The active layer ad is disposed on the first insulating layer 141. The source electrode s and the drain electrode d are spaced apart on the active layer ad. The second insulating layer 142 covers the source electrode s, the drain electrode d, the active layer ad, and the first insulating layer 141.

The pixel electrode 15 is disposed on the second insulating layer 142 and is connected to the source electrode s or the drain electrode d.

The source electrode s and the drain electrode d are disposed in a same layer.

The reflective portion 122 is disposed below the gate electrode 132 to reflect a light irradiating to the gate electrode 132, thereby improving the light utilization efficiency and reducing a risk of light leakage in an area of the non-pixel region NP where the gate electrode 132 is located.

Optionally, the array substrate 10 further comprises a first trace z1 and a transfer line z2. The first trace z1 is disposed in a same layer as the source electrode s. The transfer line z2 is disposed in a same layer as the pixel electrode 15.

The signal component 13 comprises a second trace 133. The second trace 133 is disposed on the reflective portion 122 and is disposed in a same layer as the gate electrode 132.

An end of the transfer line z2 is connected to the first trace z1, and the other end of the transfer line z2 is connected to the second trace 133.

In this embodiment, the reflective portion 122 is disposed below the second trace 133 to reflect a light irradiating to the second trace 133, thereby improving the light utilization efficiency and reducing a risk of light leakage in an area of the non-pixel region NP where the second trace 133 is located.

Optionally, the signal component 13 further comprises a data line 134. The data line 134 is disposed in a same layer as the source electrode s. The data line 134 is disposed corresponding to the reflective portion 122.

The reflective portion 122 is disposed below the data line 134 to reflect a light irradiating to the data line 134, thereby improving the light utilization efficiency and reducing a risk of light leakage in an area of the non-pixel region NP where the data line 134 is located.

, the liquid crystal panel 100 further comprises the counter substrate 20 disposed opposite to the array substrate 10. The counter substrate 20 comprises a black matrix BM. The black matrix BM is disposed corresponding to the reflective portion 122. The black matrix BM is disposed corresponding to the non-pixel region NP.

An embodiment of the present disclosure further relates to a method for manufacturing the array substrate 10, which includes the following steps.

Step B1: forming a part of a patterned common electrode layer 12 on the substrate 11.

The common electrode layer 12 comprises a common electrode 121 and a reflective portion 122. The common electrode 121 is disposed corresponding to the pixel region PX. The reflective portion 122 is disposed corresponding to a non-pixel region NP.

Step B2: forming a patterned signal component 13 and the other part of the common electrode layer on the substrate 11. The signal component 13 is disposed corresponding to the non-pixel region NP. At least a part of the signal component 13 is disposed on the reflective portion 122.

Step B3: forming an insulating unit layer 14 on the substrate 11.

Step B4: forming a pixel electrode 15 on the insulating unit layer 14.

In the method for manufacturing the array substrate 10 of the embodiment of the present disclosure, the reflective portion 122 is disposed in an area corresponding to the signal component 13 in the non-pixel region NP to reflect an incident light. In this way, even if the liquid crystals in the non-pixel region NP have a deflection difference, an amount of light leakage can be reduced, and a stray light caused by the insulating unit layer corresponding to the non-pixel region NP can be reduced, thereby improving contrast in a dark state.

Furthermore, the reflective portion 122 reflects the incident light, thereby reducing a risk of the incident light being absorbed by the signal component 13, and thus improving light utilization efficiency.

The method for manufacturing the array substrate 10 is described below.

Figure 3:
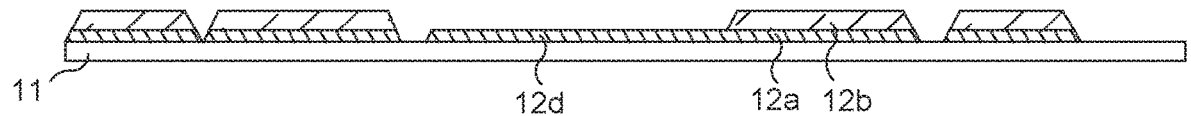
FIG. 3 is a schematic diagram of a structure of the array substrate in Step B1 according to an embodiment of the present disclosure.

In Step B1, as shown in FIG. 3, the part of the patterned common electrode layer 12 is formed on the substrate 11.

The substrate 11 may be a rigid substrate or a flexible substrate. A material of the substrate 11 comprises one of glass, sapphire, silicon, silica, polyethylene, polypropylene, polystyrene, polylactic acid, polyethylene dicarboxylate, polyethylene terephthalate, polyethylene naphthalate, Polycarbonate, polyethersulfone, aromatic fluorotoluene containing polyarylate, polycyclic olefin, polyimide or polyurethane.

Step B1 comprises the following steps.

Step B101: sequentially forming a first transparent conductive material layer and a reflective material layer on the substrate 11.

Optionally, the first transparent conductive material layer and the reflective material layer are formed on the substrate 11 by chemical vapor deposition or physical vapor deposition.

A material of the first transparent conductive material layer may be an oxide semiconductor material such as indium tin oxide or indium zinc oxide. A material of the reflective material layer may be a metallic material with reflective properties such as silver or aluminum.

A thickness of the first transparent conductive material layer is between 50 angstroms and 100 angstroms, such as 50 angstroms, 60 angstroms, 70 angstroms, 80 angstroms, 90 angstroms, or 100 angstroms. A thickness of the reflective material layer is between 200 angstroms to 1000 angstroms, such as 200 angstroms, 300 angstroms, 500 angstroms, 800 angstroms, or 1000 angstroms.

Step B102: patterning the transparent conductive layer and the reflective material layer to form a first transparent conductive layer 12a, a reflective layer 12b, and a third transparent conductive layer 12d with a mask.

Optionally, the transparent conductive layer and the reflective material layer are patterned with a grayscale mask or a halftone mask.

Then proceed to Step B2.

Figure 4:
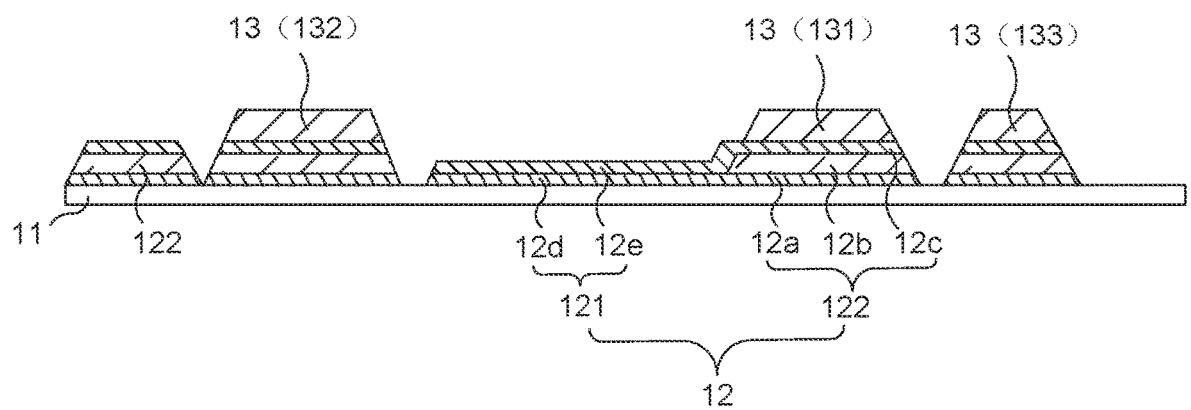
FIG. 4 is a schematic diagram of a structure of the array substrate in Step B2 according to an embodiment of the present disclosure.

Step B2, as shown in FIG. 4, the patterned signal component 13 and the other part of the common electrode layer 121 are formed on the substrate 11.

Optionally, Step B2 comprises the following steps.

Step B201: sequentially forming a second transparent conductive material layer and a first metal layer on the substrate 11. The signal component 13 is disposed corresponding to the non-pixel region NP. At least a part of the signal component 13 is disposed on the reflective portion 122.

Alternatively, the second transparent conductive material layer and the first metal layer are formed on the substrate 11 by chemical vapor deposition or physical vapor deposition.

A material of the second transparent conductive material layer may be an oxide semiconductor material such as indium tin oxide or indium zinc oxide. The first metal layer may be formed of a metal element selected from chromium (Cr), copper (Cu), aluminum (Al), gold (Au), silver (Ag), zinc (Zn), molybdenum (Mo), tantalum (Ta), titanium (Ti), tungsten (W), manganese (Mn), nickel (Ni), iron (Fe), and cobalt (Co), an alloy comprising any of the above metal elements, or an alloy of any combination of the above metal elements. In addition, the first metal layer may have a single-layer structure or a stacked structure of two or more layers.

A thickness of the second transparent conductive material layer is between 50 angstroms and 100 angstroms, such as 50 angstroms, 60 angstroms, 70 angstroms, 80 angstroms, 90 angstroms, or 100 angstroms.

Step B202: patterning the second transparent conductive material layer and the first metal layer to form a second transparent conductive layer 12c, a fourth transparent conductive layer 12e, and a gate electrode 132 and a second trace 133 of the signal component 13 with a mask.

The first transparent conductive layer 12a, the reflective layer 12b, and the second transparent conductive layer 12c are stacked to form the reflective portion 122. The third transparent conductive layer 12d and the fourth transparent conductive layer 12e are stacked to form the common electrode 121.

The reflective portion 122 is disposed under the gate electrode 132 and the second trace 133.

Then proceed to Step B3.

Figure 5:
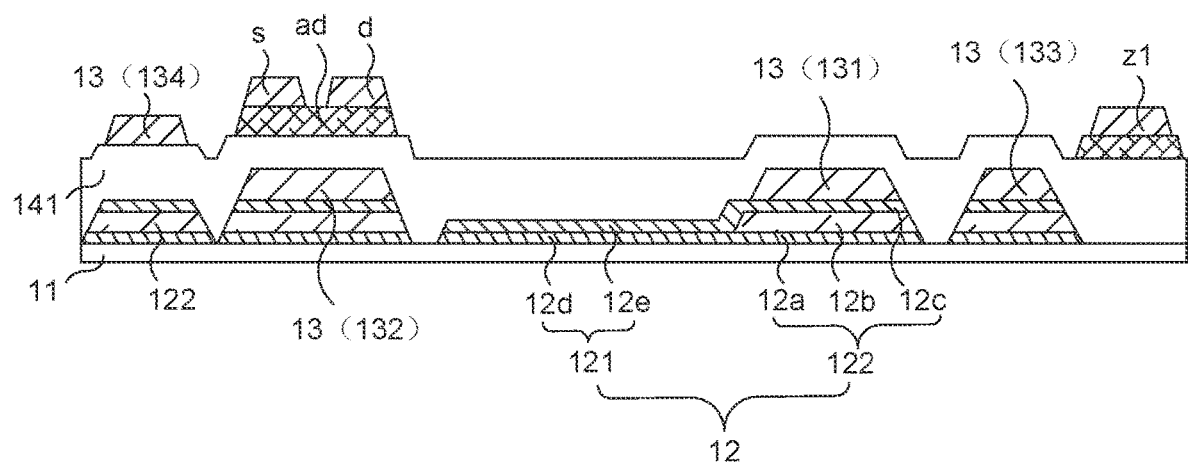
FIG. 5 is a schematic diagram of a structure of the array substrate in Step B303 according to an embodiment of the present disclosure.
Figure 6:
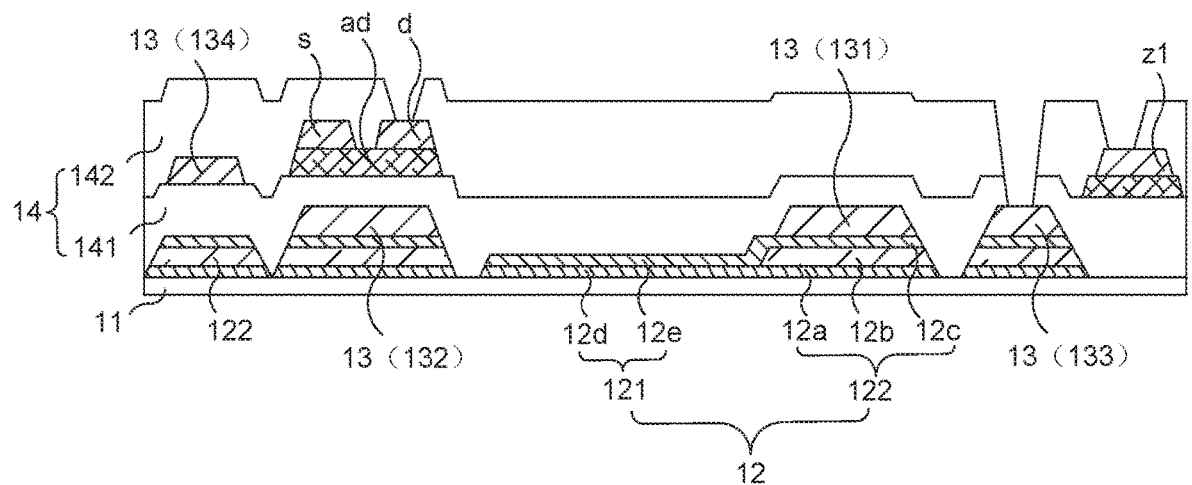
FIG. 6 is a schematic diagram of a structure of the array substrate in Step B304 according to an embodiment of the present disclosure.

In Step B3, please refer to FIG. 5 and FIG. 6, the insulating unit layer 14, an active layer ad, a source electrode s, a drain electrode d, a first trace z1, and a data line 134 are formed on the substrate 11.

Step B3 comprises the following steps.

Step B301: forming a first insulating layer 141 on the substrate 11. The first insulating layer 141 covers the patterned first metal layer and the patterned common electrode layer 12.

Optionally, the first insulating layer 141 is formed on the substrate 11 by chemical vapor deposition.

Step B302: forming the active layer ad on the first insulating layer 141.

Step B303: as shown in FIG. 5, forming the source electrode s, the drain electrode d, the first trace z1, and the data line 134 on the first insulating layer 141. The source electrode s is disposed on a side of the active layer ad, and the drain electrode d is disposed on another side of the active layer ad.

Step B304: as shown in FIG. 6, forming a second insulating layer 142 on the first insulating layer 141. The second insulating layer 142 covers the source electrode s, the drain electrode d, the active layer ad, and the first insulating layer 141.

Optionally, the second insulating layer 142 is formed on the first insulating layer 141 by chemical vapor deposition.

Then proceed to Step B4.

Figure 7:
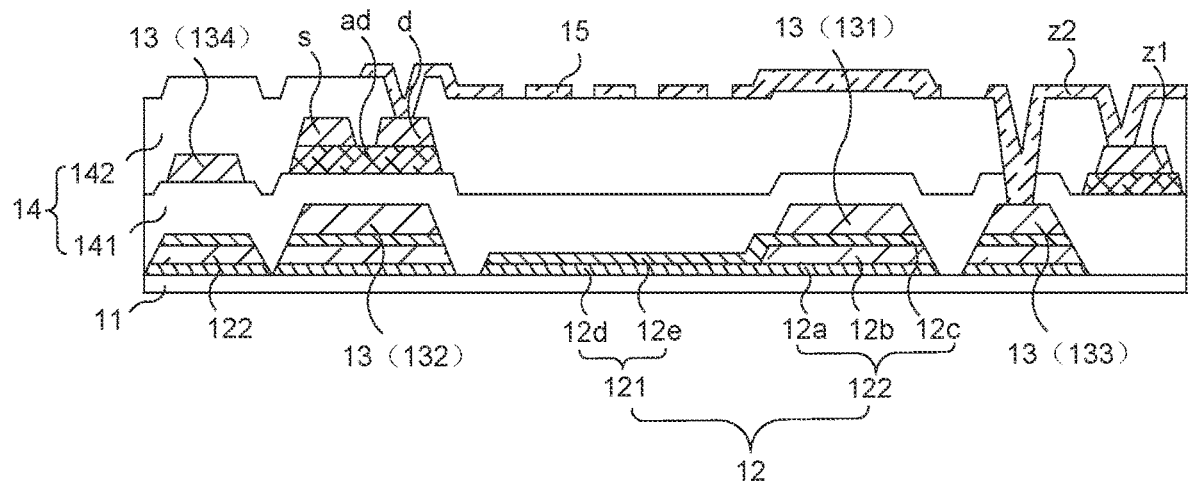
FIG. 7 is a schematic diagram of a structure of the array substrate in Step B4 according to an embodiment of the present disclosure.

In Step B4, as shown in FIG. 7, the pixel electrode 15 and a transfer line z2 are formed on the insulating unit layer 14. One end of the transfer line z2 is connected to the first trace z1, and the other end of the transfer line z2 is connected to the second trace 133.

A material of the pixel electrode 15 may be an oxide semiconductor material such as indium tin oxide or indium zinc oxide.

Thus, a process of manufacturing the array substrate in this embodiment is complete.

The liquid crystal panel provided by the embodiments of the present disclosure is described in detail above. The present disclosure uses specific examples to describe principles and embodiments of the present disclosure. The above description of the embodiments is only for helping to understand solutions of the present disclosure and their core ideas. Furthermore, those skilled in the art may make modifications to the specific embodiments and applications according to ideas of the present invention. In conclusion, the present specification should not be construed as a limitation to the present invention.

What is claimed is:

1. A liquid crystal panel, comprising an array substrate, the array substrate comprising:
    a substrate;
    a common electrode layer, disposed on the substrate and comprising a common electrode and a reflective portion, wherein the common electrode is disposed corresponding to a pixel region, and the reflective portion is disposed corresponding to a non-pixel region located around the pixel region;
    a signal component, disposed corresponding to the non-pixel region, wherein at least a part of the signal component is disposed on the reflective portion; and
    an insulating unit layer, disposed on the signal component and covering the common electrode layer and the substrate; and
    a pixel electrode, disposed corresponding to the pixel region on the insulating unit layer.

2. The liquid crystal panel according to claim 1, wherein the reflective portion comprises a first transparent conductive layer and a reflective layer, and the first transparent conductive layer and the reflective layer are stacked on the substrate.

3. The liquid crystal panel according to claim 2, wherein the reflective portion further comprises a second transparent conductive layer, the first transparent conductive layer is disposed on the substrate, the reflective layer is disposed on the first transparent conductive layer, and the second transparent conductive layer is disposed on the reflective layer.

4. The liquid crystal panel according to claim 3, wherein the common electrode is connected to the first transparent conductive layer and the second transparent conductive layer, and a thickness of the common electrode is equal to a sum of a thickness of the first transparent conductive layer and a thickness of the second transparent conductive layer.

5. The liquid crystal panel according to claim 3, wherein the common electrode comprises a third transparent conductive layer and a fourth transparent conductive layer that are stacked, the third transparent conductive layer is disposed on the substrate; and the signal component comprises a common electrode line connected to the common electrode, the first transparent conductive layer and the third transparent conductive layer are connected and integrally formed, and the second transparent conductive layer and the fourth transparent conductive layer are connected and integrally formed.

6. The liquid crystal panel according to claim 5, further comprising an active layer, a source electrode, and a drain electrode, wherein the signal component comprises a gate electrode, and the insulating unit layer comprises a first insulating layer and a second insulating layer; and the gate electrode is disposed on the reflective portion, the first insulating layer covers the gate electrode, the common electrode, and the substrate; the active layer is disposed on the first insulating layer, the source electrode and the drain electrode are spaced apart on the active layer; the second insulating layer covers the source electrode, the drain electrode, the active layer, and the first insulating layer; the pixel electrode is disposed on the second insulating layer and connected to the source electrode or the drain electrode.

7. The liquid crystal panel according to claim 6, further comprising a first trace and a transfer line, wherein the first trace is disposed in a same layer as the source electrode, and the transfer line is disposed in a same layer as the pixel electrode;

the signal component comprises a second trace disposed on the reflective portion and is disposed in a same layer as the gate electrode; and the transfer line is connected between the first trace and the second trace.

8. The liquid crystal panel according to claim 6, wherein the signal component further comprises a data line disposed in a same layer as the source electrode and disposed corresponding to the reflective portion.

9. The liquid crystal panel according to claim 3, wherein the first transparent conductive layer, the reflective layer, and the second transparent conductive layer are stacked to form a Bragg reflective structure.

10. The liquid crystal panel according to claim 1, further comprising a counter substrate disposed opposite to the array substrate, wherein the counter substrate comprises a black matrix, and the black matrix is disposed corresponding to the reflective portion.

11. A method for manufacturing a liquid crystal panel, comprising:

forming a common electrode layer on a substrate, wherein the common electrode layer comprises a common electrode corresponding to a pixel region and a reflective portion corresponding to a non-pixel region;

forming a signal component on the reflective portion corresponding to the non-pixel region;

forming an insulating unit layer on the substrate; and forming a pixel electrode on the insulating unit layer.

12. The method according to claim 11, wherein the forming the common electrode layer on the substrate comprises:

sequentially forming a first transparent conductive material layer and a reflective material layer on the substrate; and patterning the first transparent conductive material layer and the reflective material layer to form a first transparent conductive layer, a reflective layer, and a third transparent conductive layer with a mask.

13. The method according to claim 12, wherein the first transparent conductive material layer is made of an oxide semiconductor material, and the reflective material layer is made of metallic material with reflective properties.

14. The method according to claim 12, wherein a thickness of the first transparent conductive material layer ranges between 50 angstroms and 100 angstroms.

15. The method according to claim 12, wherein the mask is a grayscale mask or a halftone mask.

16. The method according to claim 11, wherein the forming the signal component on the reflective portion corresponding to the non-pixel region, comprises:

sequentially forming a second transparent conductive material layer and a first metal layer on the substrate;

patterning the second transparent conductive material layer and the first metal layer to form a second transparent conductive layer, a fourth transparent conductive layer, and a gate electrode and a second trace of the signal component, wherein the first transparent conductive layer, the reflective layer, and the second transparent conductive layer are stacked to form the reflective portion, and the third transparent conductive layer and the fourth transparent conductive layer are stacked to form the common electrode.

17. The method according to claim 16, wherein the forming the insulating unit layer on the substrate, comprises:

forming a first insulating layer covering the first metal layer and the common electrode layer;

forming an active layer on the first insulating layer;

forming a source electrode, a drain electrode, a first trace, and a data line on the first insulating layer; and forming a second insulating layer covering the source electrode, the drain electrode, the active layer.

18. The method according to claim 16, wherein the second transparent conductive material layer is made of an oxide semiconductor material.

19. The method according to claim 16, wherein a thickness of the second transparent conductive material layer ranges between 50 angstroms and 100 angstroms.

20. The method according to claim 16, wherein the forming the pixel electrode on the insulating unit layer comprises:

forming the pixel electrode and a transfer line on the insulating unit layer, wherein the transfer line is connected to the first trace and the second trace.

* * * * *